March 11, 1930. J. S. NAIRN 1,750,020
CINEMATOGRAPH PROJECTION APPARATUS
Filed Oct. 21, 1927
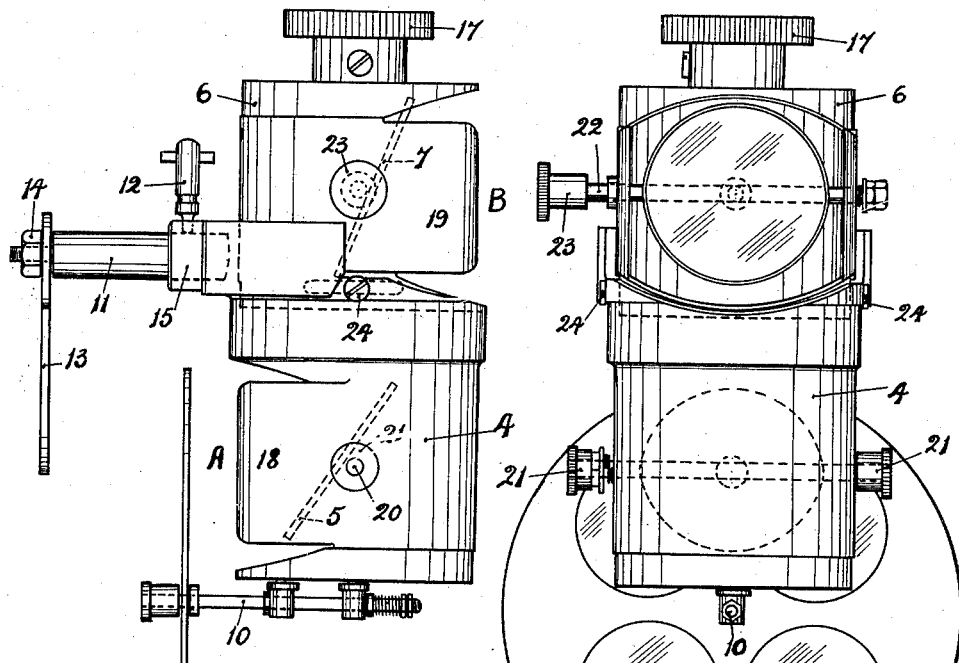
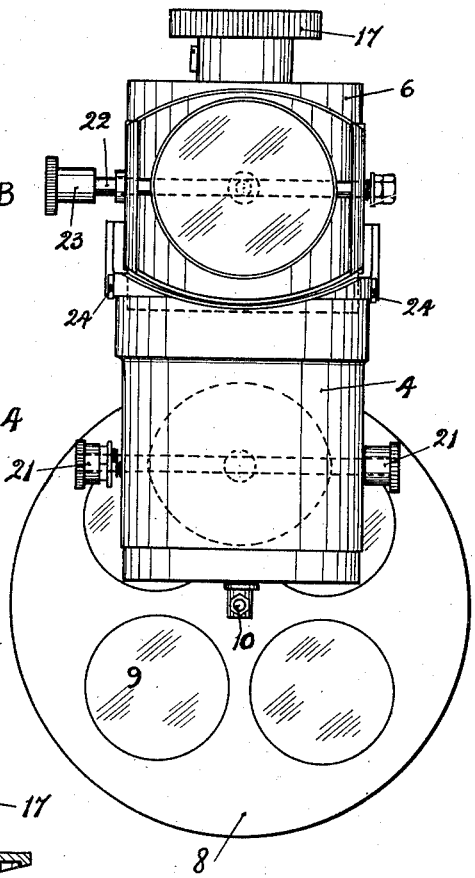
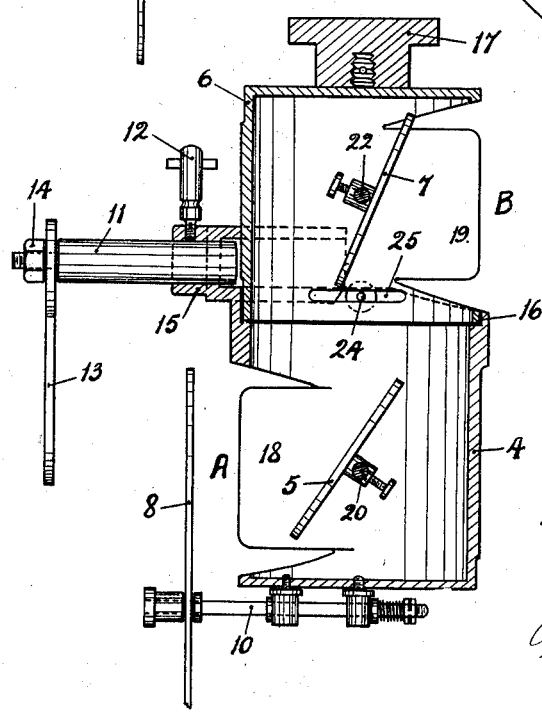

Patented Mar. 11, 1930

1,750,020

UNITED STATES PATENT OFFICE

JAMES SWORD NAIRN, OF WARDIE, EDINBURGH, SCOTLAND

CINEMATOGRAPH PROJECTION APPARATUS

Application filed October 21, 1927, Serial No. 227,784, and in Great Britain November 5, 1926.

This invention relates to cinematograph projection apparatus and has for its object to obviate the use of a separate spot light for projecting a beam of light on to any part of the screen, orchestra or auditorium, by utilizing the cinematograph projector itself as the source of the beam of light.

According to my invention, the cinematograph projector is combined with a device in front of the lens for projecting a beam of light on to any part of the screen, orchestra or auditorium, the said device being either detachable or adapted to be swung out of the way when not required.

The device includes a system of reflecting surfaces or mirrors adjustably arranged so as to direct the reflected beam of light in any desired direction. The device may also be combined with colour screens or filters interposed between the projector and the reflecting surfaces or mirrors in order that any desired colour may be projected on to the screen, orchestra or auditorium.

The accompanying drawings illustrate the preferred embodiment of my invention, Fig. 1 being a side view of the spot light device, Fig. 2 a front view and Fig. 3 a vertical sectional view.

In carrying out my invention as illustrated, the device comprises a vertical tube or casing 4 adapted to be detachably clamped on to the front of the projection lantern (not shown), the side of the casing opposed to the projection lens being open at A to allow the light to be directed from the lens of the projector on to an inclined fixed or adjustable mirror 5 in the lower part of the casing. Within the upper part 6 of the casing, which is rotatable about a vertical axis upon the lower part 4 of the casing, a second mirror 7 is adjustably mounted upon a horizontal axis and adapted to project the reflected beam of light through an opening B in the front of the upper rotatable portion of the casing. The reflected beam of light can thus be directed vertically by adjusting the upper mirror 7 upon its horizontal axis and the beam of light can be directed horizontally by rotating the upper portion 6 of the casing.

In order that any desired colour may be projected, the lower end of the casing 4 may be adapted to receive a rotatable disc or shutter 8 carrying a series of differently coloured screens or filters 9 or a plain aperture, any one of which may be brought into position between the projection lens and the lower mirror 5 of the device by rotating the disc 8 which may be detachably mounted upon a horizontal spindle 10 at the lower end of the casing.

The casing 6 may be rotatably mounted upon a horizontal stud 11 forming a fixture on or adapted to be clamped on to the front of the projection lantern, so that the casing may be turned upon the horizontal stud 11 into either its vertical and operative position or into a non-operative position when the cinematograph is in operation, a clamping screw 12 being provided for securing the casing in either operative or inoperative position.

The outline and area of the projected beam of light may be varied as desired by using suitably apertured slides in the projection lantern, thus enabling a spot light of any desired outline, such as circular, star-shaped, rectangular, or any other desired outline and of any desired area to be projected on to the screen, orchestra or auditorium.

In the construction illustrated, the device is fixed to a bracket 13 which is secured to a convenient part of the frame of the projection lantern, the stud 11 being secured in a slot in the bracket 13 by means of a nut 14. The stud 11 fits loosely at its other end in a socket formed in a projection 15 on the lower half 4 of the casing and is clamped in any desired position in the socket by means of the pinching screw 12. The lower half 4 of the casing is thus held stationary and is formed with an internal shoulder 16 to receive and rotatably support the upper half 6 of the casing, which is fitted with a knurled knob 17 to enable it to be conveniently rotated upon the lower half 4 of the casing.

The apertures A and B in the casing are formed by making the middle portion of the two halves of the casing substantially U-shaped in cross section, thereby providing a pair of wings 18 and 19 on each side of the apertures A and B respectively. The lower mirror 5 is fixed upon a transverse spindle 20 which is rotatably supported in the lower half 4 of the casing and can be turned by manipulating knurled knobs 21. The upper mirror 7 is similarly mounted upon a transverse spindle 22 rotatable in the upper half 6 of the casing by turning a knob 23 which is fixed on the spindle 22. Studs 24 fixed to the lower half 4 of the casing pass through slots 25 in the upper half 6 of the casing to limit the angle of rotation of the upper half of the casing The provision of the knob 23 enables the operator to revolve the upper half 6 of the casing upon the lower simultaneously with effecting the adjustment of the angle of the upper mirror 7 by rotating the spindle 22. The spot light can thus be directed by one hand, leaving the operator's other hand free, e. g. for manipulating the lantern or for focusing or for any other operation which may be necessary.

Claims:

1. A spot-light attachment for a projection lantern comprising a lower casing apertured to receive a beam of light from the lantern, a transverse rotatable spindle journalled in said casing, a reflector fixed on said spindle, an upper casing rotatably superimposed upon the lower casing and apertured to emit a beam of light, a transverse shaft journalled in the upper casing, a reflector fixed on said shaft, and a knob externally mounted upon said shaft for rotating said shaft and simultaneously revolving the upper casing with respect to the lower casing.

2. A spot-light attachment according to claim 1, having means for revolubly attaching it to the lantern to enable the attachment to be turned from an operative position into an inoperative position and vice-versa.

3. A spot-light attachment for a projection lantern comprising a vertical casing having an upper apertured part rotatable upon a lower apertured part, means for detachably clamping the lower part to the projection lantern and for enabling it to be turned into or out of the beam of light from the lantern, a reflector mounted upon a transverse rotatable spindle in each part of the casing and a knob externally mounted on the upper part of the casing upon the spindle of the reflector therein for simultanenously adjusting the upper reflector and revolving the upper part of the casing.

4. A spot-light attachment for a projection lantern comprising a lower casing apertured to receive a beam of light from the lantern, a reflector in said casing, an upper casing mounted on said lower casing, a reflector mounted in said upper casing, and means for moving said second reflector in any desired position relative to said first reflector.

5. A spot-light attachment for a projection lantern comprising a lower casing apertured to receive a beam of light from the lantern, a reflector in said casing, an upper casing mounted on said lower casing, a reflector mounted in said upper casing, and means for simultaneously moving said second reflector both vertically and horizontally.

6. A spot-light attachment for a projection lantern comprising a lower casing apertured to receive a beam of light from the lantern, a reflector in said casing, an upper casing rotatably mounted on said lower casing, a reflector adjustably mounted in said upper casing, and means for simultaneously adjusting said reflector in said upper casing and rotating said upper casing with respect to said lower casing.

In testimony whereof I affix my signature.

JAMES SWORD NAIRN.